No. 697,005. Patented Apr. 8, 1902.
J. NORTHROP.
SELF THREADING LOOM SHUTTLE.
(Application filed Feb. 13, 1902.)
(No Model.)
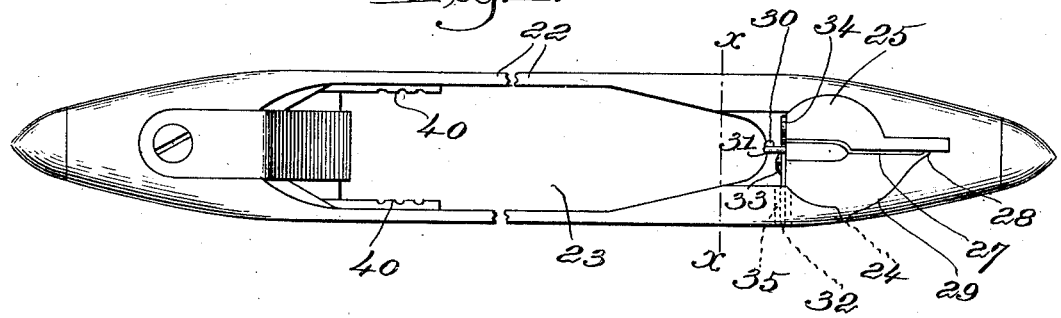
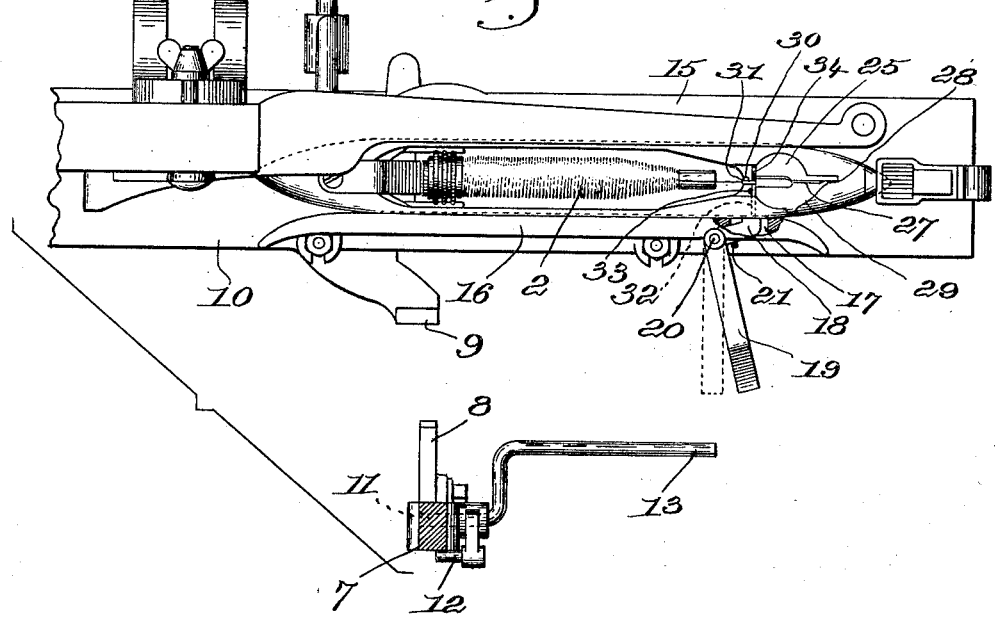
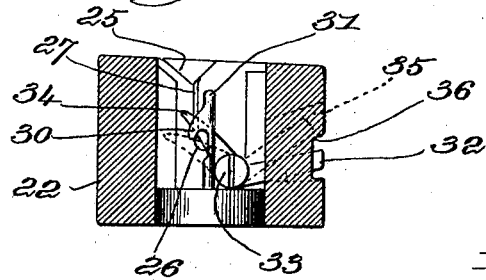
Witnesses. Inventor.
Thomas J. Drummond. Jonas Northrop.
Herman J. Sartoris. by Wesley & Gregory
Atty's
THE NORRIS PETERS CO., PHOTO-LITHO., WASHINGTON, D. C.

UNITED STATES PATENT OFFICE.

JONAS NORTHROP, OF HOPEDALE, MASSACHUSETTS, ASSIGNOR TO DRAPER COMPANY, OF HOPEDALE, MASSACHUSETTS, A CORPORATION OF MAINE.

SELF-THREADING LOOM-SHUTTLE.

SPECIFICATION forming part of Letters Patent No. 697,005, dated April 8, 1902.

Original application filed July 8, 1901, Serial No. 67,437. Divided and this application filed February 13, 1902. Serial No. 93,874. (No model.)

*To all whom it may concern:*

Be it known that I, JONAS NORTHROP, a subject of the King of Great Britain, and a resident of Hopedale, county of Worcester, State of Massachusetts, have invented an Improvement in Automatic Self-Threading Loom-Shuttles, of which the following description, in connection with the accompanying drawings, is a specification, like numerals on the drawings representing like parts.

This application is a division of application Serial No. 67,437, filed by me the 8th day of July, 1901, for United States Letters Patent for an improvement in automatic filling-replenishing loom.

In the application referred to the shuttle which forms the subject-matter of this application is shown and described, but no claims are made in the parent case for the shuttle *per se*, as such claims are made herein.

The shuttle hereinafter described and claimed is designed for use in that type of automatic loom wherein the filling in the shuttle is automatically replenished upon failure of the filling and the controlling device, which becomes operative upon such failure, is mounted upon the shuttle itself.

The various novel features of my invention will be hereinafter described, and particularly pointed out in the following claims.

Figure 1 is a top or plan view, centrally broken out, of a shuttle embodying my invention. Fig. 2 is a top or plan view of the inner end of the lay of a loom—that is, the end at which change of filling is effected—the shuttle-box being shown with a shuttle therein embodying my invention, and a part of the means for controlling the operation of the replenishing mechanism is also shown; and Fig. 3 is a transverse sectional detail, enlarged, on the line *x x*, Fig. 1.

I have not herein shown any filling-replenishing mechanism, as it may be in construction substantially such as shown in United States Patent No. 529,940, the filling-carriers being mounted in a feeder supported on the breast-beam, the transferrer having a depending arm (shown in section at 7, Fig. 2) provided with a dog 8 to be at times engaged by a bunter 9 on the lay 10 to effect a transfer of filling as the lay beats up whenever the dog is brought into position to be engaged by the bunter 9. As in the application hereinbefore referred to, a rock-shaft 11 is mounted in the lower end of the arm 7, the dog 8 being secured to the said rock-shaft, a stop-pin 12, mounted on the dog and extended across the front face of the arm 7, limiting downward movement of said rock-shaft, which latter has an ⌐-shaped arm 13, the longer portion of which is parallel to the lay and extended toward it to be engaged by suitable means to turn the dog into position to be engaged by the bunter.

Referring to Figs. 1, 2, and 3, the shuttle 22 has an elongated opening 23 extended therethrough from top to bottom, as is common in self-threading shuttles, to contain a supply of filling 2 (see Fig. 2) when transferred thereto from the feeder, and at one end the shuttle is provided with an automatic self-threading device to conduct the thread automatically to the side delivery-eye 24 of the shuttle.

The threading device herein illustrated is substantially that forming the subject-matter of United States Patent No. 556,705, dated May 17, 1896, the block 25 having a thread-passage 26, (see Fig. 3,) provided with a longitudinal entrance 27, a downturned spur 28 preventing accidental withdrawal of the thread from the passage 26, the thread passing between the top of the shuttle and the curved edge 29 of the threading-block to the delivery-eye, as in Patent No. 556,705. I have mounted a downhold on the shuttle-body just back of the threading-block and consisting of a downturned hook 30 (best shown in Fig. 3) opposite the inner end of the thread-passage 26 and secured to or forming part of an upright post 31, bent at its upper end to engage the threading-block and at its lower end inserted in the wood of the shuttle. Between the post and the block I have mounted an actuating device comprising a body portion or actuator proper, 32, fulcrumed at 33 on a suitable horizontal stud parallel with the longitudinal axis of the shuttle, a detecting-finger 34 being secured to or forming a part of the said body portion, said device as a whole being adapted to rock in a plane transverse to the longitudinal axis of the shuttle. The actuator 32 is extended longitudinally through an upright slot 35 in the side of the shuttle, and when in full-line or operative position, Fig. 3, the actuator projects beyond the side of the shuttle, which latter is shown as having a longitudinal side groove, as at 36. When the threading of the shuttle is effected, however, the thread between the block 25 and the filling-carrier 2 engages and presses down the finger 34, and thereby lifts the actuator into dotted-line position, Fig. 3, so that said actuator is above the groove 36, the thread at such time slipping down under the hook-like downhold 30, and so long as the filling-thread remains intact it will maintain the actuator in its inoperative dotted-line position, Fig. 3. Breakage or exhaustion of the filling, however, releases the finger and the actuator drops into full-line position, Fig. 3, the body portion 32 being the heavier, and the projecting part thereof in the groove 36 will be in position to engage a device mounted on the shuttle-box and shown in Fig. 2.

Referring to Fig. 2, the shuttle-box 15 is of usual construction, except that the front wall 16 is apertured at 17 to receive the inturned end of a cam-foot 18, secured to a dagger 19, which is mounted to rock on an upright stud 20 on the lay in front of the shuttle-box. As in my application hereinbefore referred to, this dagger is so located relatively to the long part of the arm 13 that when the former is in dotted-line position, Fig. 2, it will engage and elevate said arm as the lay beats up, to thereby operatively position the dog 8, the free end of the dagger being bent to constitute a species of cam-surface upon which the horizontal part of the arm 13 slides, to be lifted thereby. As shown in Fig. 2, the foot 18 normally projects beyond the inner face of the front wall 16, a spring 21 maintaining the foot and dagger in full-line position. When the actuator 32 on the shuttle moves into full-line operative position, it will engage the foot 18 as the shuttle is about to complete its movement into the shuttle-box 15, and when such movement has been completed the actuator will have pushed the foot 18 outward and have swung the dagger 19 into operative or dotted-line position, Fig. 2, to engage the arm 13 as the lay beats up, and filling-replenishing will be effected on that beat of the lay. The foot 18 enters the side groove 36 of the shuttle at every alternate pick, as will be manifest; but normally the actuator will be held up above it, so as to cause no effective movement of the dagger; but whenever the filling has been broken or run out the replenishing mechanism will be operated by the proper boxing of the shuttle in the inner box.

The shuttle is provided with suitable holding devices or jaws 40 for the head or base of the filling-carrier, as shown in Figs. 1 and 2.

Having fully described my invention, what I claim as new, and desire to secure by Letters Patent, is—

1. A loom-shuttle having an elongated opening therethrough to receive a supply of filling, and a slot in its side wall, a device at one end of said opening to automatically effect the threading of the shuttle, an actuator movably mounted on the shuttle within said opening and extended laterally through the slot, and a finger on the actuator extended transversely of the shuttle, and normally engaged and depressed by the filling adjacent the threading device to maintain the actuator in inoperative position.

2. A loom-shuttle having a slot in its side wall, and a delivery-eye, a device to automatically thread the shuttle, a fixed downhold adjacent said device, and an actuator pivotally mounted on the shuttle and extended through the slot, said actuator having a finger movable between the downhold and the threading device, the filling in its passage from the filling-carrier to the threading device passing under the downhold and over the finger, to retain the actuator inoperative while the filling is present or intact.

3. An automatically self-threading shuttle adapted to contain a supply of filling, and having a slot in its side wall, an actuator mounted on the shuttle and having a finger transverse to the path of the filling, said actuator having a body portion projecting through the slot in the side wall of the shuttle, and adapted to project laterally beyond the side, when free to move, the filling normally engaging and depressing the finger, and thereby maintaining the actuator in inoperative position.

4. An automatically self-threading shuttle adapted to contain a supply of filling, and having an opening in its side wall, a tilting actuator mounted on the shuttle and having its inner end extended across the path of and adapted to be automatically engaged by the filling-thread, and depressed thereby upon insertion of a supply of filling into the shuttle, the outer end of the actuator extending into the opening in the shuttle side, the action of the filling upon the inner end of the actuator depressing the same, and elevating its outer end to thereby render the actuator inoperative while the filling is present.

5. In an automatically self-threading shuttle, adapted to contain a supply of filling, a threading device, a tilting actuator mounted on the shuttle adjacent the inner end of said threading device, said actuator having its inner end extended transversely across and to be engaged and depressed by the filling-thread between the filling-supply in the shuttle and the threading device, the inner end of the actuator being extended through an opening in the side wall of the shuttle, the thread while intact maintaining the actuator tilted with its outer end in inoperative position.

In testimony whereof I have signed my name to this specification in the presence of two subscribing witnesses.

JONAS NORTHROP.

Witnesses:
FRANK J. DUTCHER,
ERNEST W. WOOD.